(12) United States Patent
McGowan

(10) Patent No.: US 6,206,471 B1
(45) Date of Patent: Mar. 27, 2001

(54) SHOPPING CART SAFETY SEAT

(76) Inventor: Gayla McGowan, 700 N. Sioux, Independence, MO (US) 64056

( * ) Notice: Subject to any disclaimer, the term of this patent is extended or adjusted under 35 U.S.C. 154(b) by 0 days.

(21) Appl. No.: 09/497,911

(22) Filed: Feb. 4, 2000

(51) Int. Cl.[7] .................................................. B60R 22/10
(52) U.S. Cl. ................................ 297/256.17; 297/219.12
(58) Field of Search .......................... 297/219.12, 256.17, 297/229, 467

(56) References Cited

U.S. PATENT DOCUMENTS

| | | |
|---|---|---|
| 2,652,183 | 9/1953 | Hlivka . |
| 2,797,743 | 7/1957 | Rodtz . |
| 3,578,380 | 5/1971 | Jacobus . |
| 3,940,166 | 2/1976 | Smithea . |
| 4,655,502 | 4/1987 | Houllis . |
| 4,761,032 | 8/1988 | Sanchez et al. . |
| 4,805,937 | 2/1989 | Boucher et al. . |
| 4,824,168 | 4/1989 | Makoski . |
| 4,840,841 | 6/1989 | Madsen . |
| 4,883,701 | 11/1989 | Rankin et al. . |
| 5,330,250 | 7/1994 | Reyes . |
| 5,547,250 | * 8/1996 | Childers ............................ 297/256.17 |
| 5,678,888 | 10/1997 | Sowell et al. . |
| 5,855,412 | * 1/1999 | Smith et al. ....................... 297/256.17 |
| 5,897,165 | * 4/1999 | Kucharczyk et al. ........... 297/256.17 |
| 5,967,607 | * 10/1999 | Walchoup ........................ 297/256.17 |

* cited by examiner

*Primary Examiner*—Peter R Brown
(74) *Attorney, Agent, or Firm*—Matthew J. Pierce, Esq.

(57) ABSTRACT

The present device is a foldable cushion safety seat, manufactured from durable fabric and foam, that would be placed into the seat area of any standard shopping cart. The present invention would be secured to the cart by two VELCRO tabs and an incorporated handle bar cushion extending from the front of the seat when attached to the handle of the cart by a pair of VELCRO tabs also. The device would feature an adjustable nylon strap that, once a child would be placed in the seat, would secure the child in place. A short length of the nylon strap would be attached to the upper section of the safety seat. Once a child would be placed onto the lower section of the safety seat, the strap would then be tightened around the child's mid-section as needed. A replaceable and detachable child guard would protect the cushioned seat from stains. A pocket on the back portion of the seat would provide storage for a milk bottle, and two pockets on the opposite end of the back portion would provide miscellaneous storage for toys, coupons, or other small items.

1 Claim, 3 Drawing Sheets

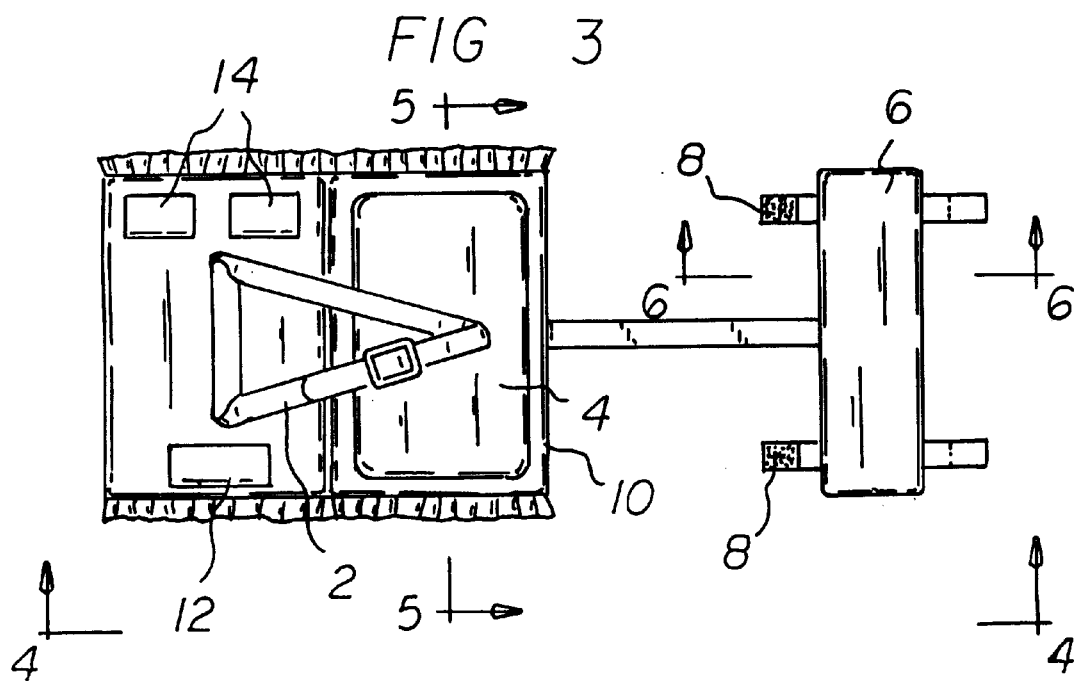
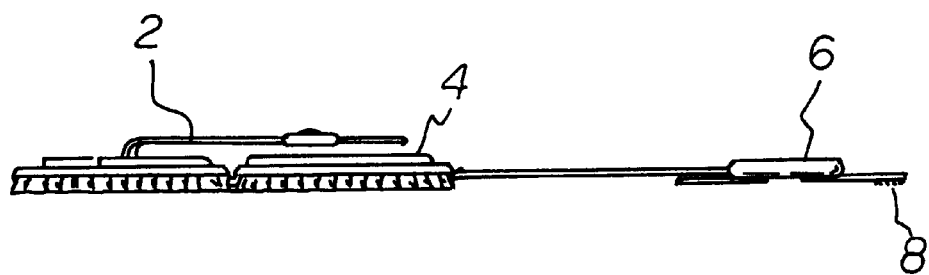

SHOPPING CART SAFETY SEAT

I BACKGROUND OF THE INVENTION

The present invention concerns that of a child safety seat, and more particularly is concerned with that of a child safety seat for use with toddlers and small children with shopping carts.

II. DESCRIPTION OF THE PRIOR ART

U.S. Pat. No. 5,678,888, issued to Sowell et al., discloses a shopping cart seat cover that is made from pliable material and has a seat section, a back section, a front section, and two side sections.

U.S. Pat. No. 5,330,250, issued to Reyes, discloses an apparatus that supports a seated infant in a shopping cart. This invention holds the infant in an upright position while allowing the infant to move his head and arms freely. The invention includes a backrest that is padded and made of flexible material that conforms to an infant's posture when seated. The base is padded and has an extension providing additional comfort to the infant's leg's when seated. An attachment strap holds the liner into the child seat, while a restraining strap holds the child within the liner.

U.S. Pat. No. 4,883,701, issued to Rankin et al., discloses a disposable infant seat liner that is described with the shoulder strap receiving slotways and leg or crotch receiving slotways designed to fit infant seat liners having various strap placements.

U.S. Pat. No. 4,840,841, issued to Madsen, discloses a disposable one-piece seat liner formed from a uniform layer of absorbent cellulosic fibers possessing sufficient integrity than it does not abrade during normal use bonded to a flexible moisture repellant backing sheet.

U.S. Pat. No. 4,824,168, issued to Makoski, discloses an organizing apparatus for an umbrella type baby stroller that provides a plurality of readily accessible pockets.

U.S. Pat. No. 4,805,937, issued to Boucher et al., discloses a handle cover for a shopping cart that is formed from a padded fabric strip.

U.S. Pat. No. 4,761,032, issued to Sanchez et al., discloses an infant seat cover having a cover pad to be placed over the seat and a blanket and a protective hood attached to the front end and head ends, respectively, of the pad.

U.S. Pat. No. 4,655,502, issued to Houllis, discloses an invention that relates to a foldable seat cushion having at least one blank for use in the seat basket of a shopping cart. The device is constructed so that the back portion of the seat cushion can be adjusted for the width of the seat basket and affixed and positioned thereupon.

U.S. Pat. No. 3,940,166, issued to Smithea, discloses an invention that relates to an auxiliary seat and back cushion means with a safety belt for protective retention of a passenger riding behind the operator of an open vehicle such as a motorcycle.

U.S. Pat. No. 3,578,380, issued to Jacobus, discloses a thin sheet of pliable material configured to removably fit the seat of a conventional shopping cart in covering relation to all cart surfaces forming a portion of and adjacent to such seat.

U.S. Pat. No. 2,797,743, issued to Rodtz, discloses an invention that is especially well adapted for use in carriages of the stroller type and like carriages which may be easily and readily converted from chairs to beds and vice versa.

U.S. Pat. No. 2,652,183, issued to Hlivka, discloses an improvement in a device for holding a baby in a highchair.

III. SUMMARY OF THE INVENTION

The present invention would be a foldable cushion safety seat, manufactured from durable fabric and foam, that would be placed into the seat area of any standard shopping cart. The present invention would be secured to the cart by two VELCRO tabs and an incorporated handle bar cushion extending from the front of the seat when attached to the handle of the cart by a pair of VELCRO tabs also. The present invention would feature an adjustable nylon strap that, once a child would be in the seat, would secure the child in place. A short length of the nylon strap would be attached to the upper section of the safety seat. Once a child would be placed onto the lower section of the safety seat, the strap would then be tightened around the child's mid-section as needed. A replaceable and detachable child guard would protect the cushioned seat from stains. A pocket on the back portion of the seat would provide storage for a milk bottle, and two pockets on the opposite end of the back portion would provide miscellaneous storage for toys, coupons, or other small items.

It is therefore an object of the present invention to provide a new and improved safety seat for use by small children.

It is another object of the present invention to provide a new and improved safety seat for use by small children to be used with shopping carts.

It is another object of the present invention to provide a new and improved safety seat for use by small children that is easy to install.

It is still another object of the present invention to provide a new and improved safety seat for use by small children that is inexpensive and efficient to manufacture.

It is still another object of the present invention to provide a new and improved safety seat for use by small children that provides ease of use.

Other objects, features and advantages of the present invention will become more readily apparent from the following detailed description of the preferred embodiment when considered with the attached drawings and appended claims.

IV. BRIEF DESCRIPTION OF THE DRAWINGS

FIG. 3 shows an isometric view of the present invention.

FIG. 4 shows a side view of the embodiment of FIG. 3.

V. DESCRIPTION OF THE PREFERRED EMBODIMENT

Figure 1:
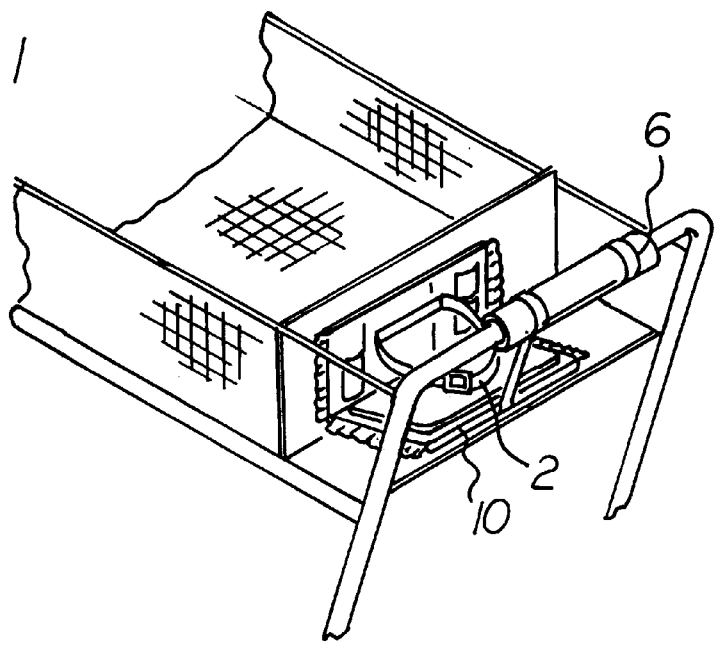
FIG. 1 shows a top view of the present invention.
Figure 2:
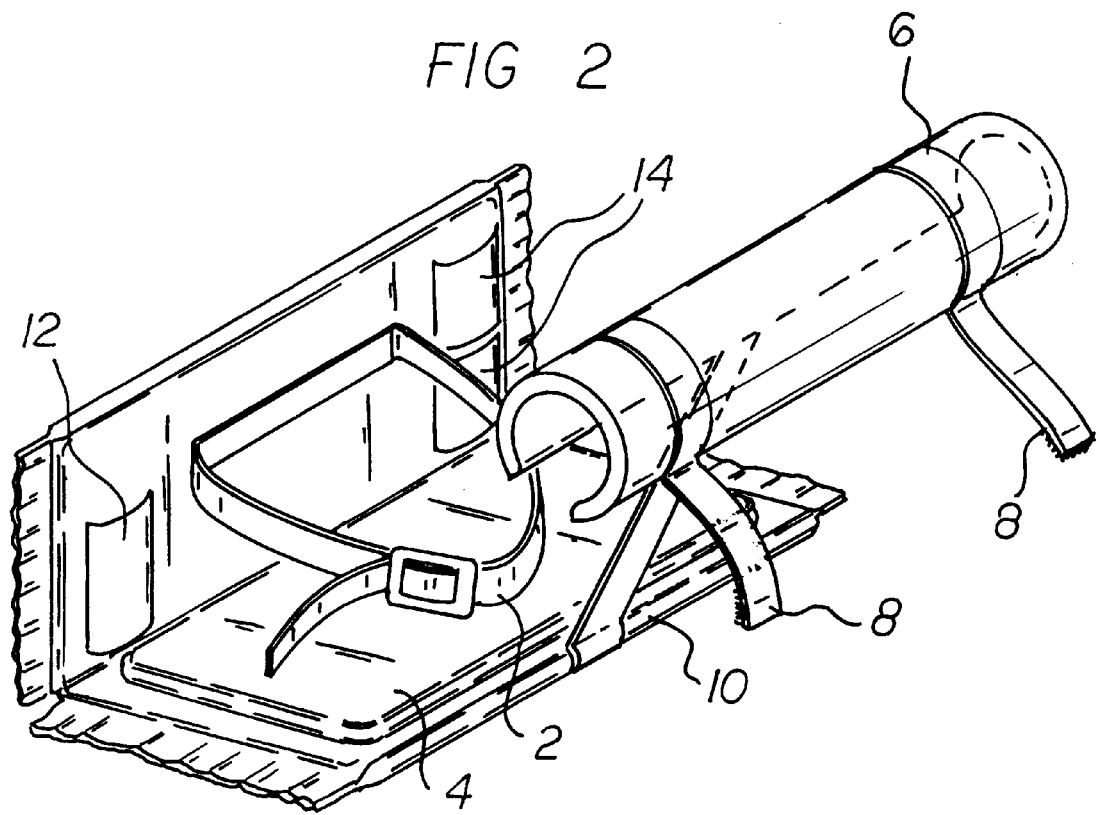
FIG. 2 shows a side view of the present invention.
Figure 5:
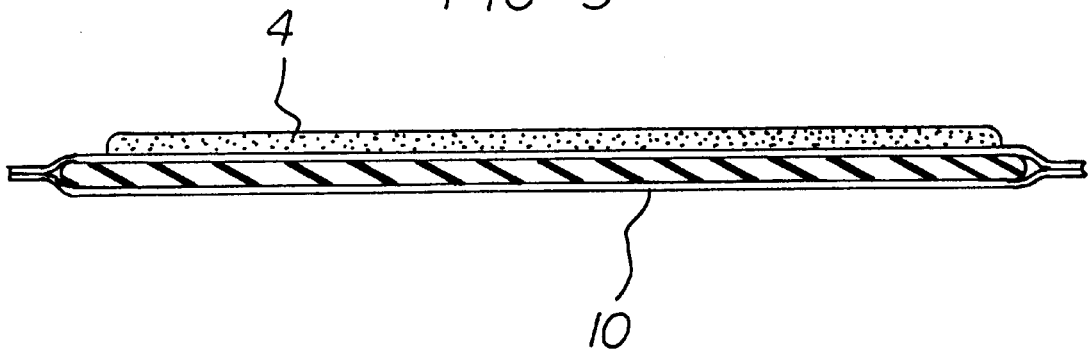
FIG. 5 shows a cut-away view along section line 5—5 of FIG. 3.
Figure 6:
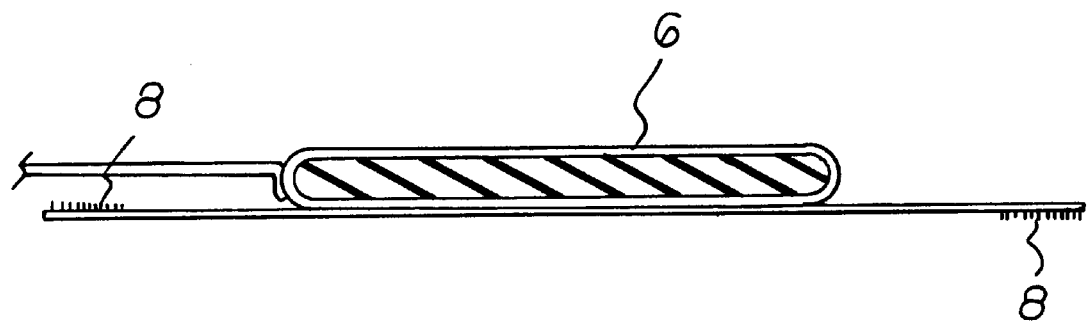
FIG. 6 shows a cut-away view along section line 6—6 of FIG. 3.

FIG. 1 shows a top view of the present invention. Backing 11 is shown pivotly connected to cushioned seat 10. Cushioned seat 10 and backing 11 are manufactured from a durable fabric and foam with a fabric outer layer covering an inside layer of foam. Cushioned seat 10 and backing 11 each have a top surface and a bottom surface. Cushioned seat 10 has two side edges, a connected side edge and an extended side edge, and has two ends, a first end and a second end. Backing 11 has two side edges, a connected side edge and an extended side edge, and two ends, a first end and a second end. Both the first end and the second end of cushioned seat 10 and the first end and second end of backing 11 have end-mounted ruffles 18 attached, with ruffles 18 extending approximately one to two inches away from both the first end and second end of cushioned seat 10 and the first end and second end of backing 11. The connected side edge of cushioned seat 10 is attached to the connected side edge of backing 11, with ruffle 18 being connected to the present invention by stitching.

The top surface of cushioned seat 10 also allows for the attachment of child guard 4. Child guard 4 would be replaceable and detachable and would protect cushioned seat 10 from stains while the present invention would be in use.

The present invention also includes adjustable strap 2, which is fabricated from nylon. A specific length of adjustable strap 2 would be attached to backing 11. The method of attachment for adjustable strap 2 would give allow a user, once a child has been placed on top of cushioned seat 10, to tighten adjustable strap 2 around the child's mid-section with fastener 3, which would be an adjustable fastener that could be adjusted depending the size of a particular child placed in the present invention.

The top surface of the first end of backing 11 would include a plurality of miscellaneous storage pockets 14, which would allow for the placement of toys, coupons, and other small objects while the present invention would be in use. The second end of the top surface of backing 11 would include a storage pocket 12, which would preferably be used for storage of a milk bottle. Storage compartment 12 and miscellaneous storage compartments 14 are stitched into the outer fabric covering of backing 11 and themselves are fabricated from nylon.

Handle Bar Cushion Connector 7 would be connected to the bottom surface of cushion seat 10 and would be also be connected to handle bar cushion 6. Handle bar cushion 6 would be designed to wrap around a standard handle bar of a shopping cart. Handle bar cushion 6 would be in the shape of a rectangle and would include two side edges, a first side edge and a second side edge, and two ends, a first end and a second end. Handle bar cushion 6 would also include a top surface and a bottom surface. Handle bar cushion connector 7 would be attached to the bottom surface of the first side edge of handle bar cushion 6 approximately halfway between the first end and the second end of handle bar cushion 6.

The present invention also includes a pair of handle straps, which comprise handle straps 16 and 17. Handle strap 16 is fixedly mounted to the bottom surface of handle bar cushion 6 near the first end of handle bar cushion 6, while handle strap 17 is fixedly mounted to the bottom surface of handle bar cushion 6 near the second end of handle bar cushion 6. The length of both handle strap 16 and handle strap 17 is greater than that of the width of handle bar cushion 6. Therefore, handle strap 16 and handle strap 17 stick out on both sides of handle bar cushion 6.

Handle straps 16 and 17 each have two ends, a first end and a second end, and two surfaces, a top surface and a bottom surface. The top surfaces of the first end of both handle strap 16 and handle strap 17 include a male VELCRO tab 8 fixedly mounted to it, while the bottom surfaces of the second ends of both handle strap 16 and handle strap 17 include a female VELCRO tab 9 fixedly mounted to it. Once handle bar cushion 6 is properly wrapped around a handle bar of a shopping cart, both said male VELCRO tabs 8 can be wrapped around said handle bar and removably fixated to the appropriate female VELCRO tab 9 in order to secure handle bar cushion 6 to a handle bar of the shopping cart. Proper placement of a handle bar of a shopping cart would include placing the handle bar of a shopping cart from the first end of handle bar cushion 6 to the second end of handle bar cushion 6, and then wrapping handle bar cushion 6 around the handle bar of the shopping cart.

What I claim as my invention is:

1. A child safety seat for shopping carts, said child safety seat comprising:

(a) a backrest, said backrest including two surfaces, a top surface and a bottom surface, said backrest including two sides edges, a connected side edge and an extended side edge, said backrest including two ends, a first end and a second end, (b) a cushioned seat, said cushioned seat including two surfaces, a top surface and a bottom surface, said cushioned seat including two side edges, a connected side edge and an extended side edge, said cushioned seat including two ends, a first end and a second end, said connected side edge of said cushioned seat being connected to said connected side edge of said backrest, (c) a child guard, said child guard being detachable, said child guard removably attached to the top surface of said cushioned seat, (d) an adjustable strap, said adjustable strap fixedly attached to the top surface of said backrest, said adjustable strap designed to temporarily fasten about the waist of a child, said adjustable strap having fastening means, (e) a plurality of miscellaneous storage pockets, said miscellaneous storage pockets being fixedly attached to the top surface of the first end of said backrest, (f) a storage pocket, said storage pocket being fixedly attached to the second end of said top surface of said backrest, said storage pocket designed to receive and store a standard milk bottle, (g) a handle bar cushion connector, said handle bar cushion connector being connected to the bottom surface of said cushioned seat, (h) a handle bar cushion, said handle bar cushion being attached to said handle bar cushion connector, said handle bar cushion including two side edges, a first side edge and a second side edge, said handle bar cushion including two ends, a first end and a second end, said handle bar cushion including two surfaces, a top surface and a bottom surface, said handle bar cushion connector being attached to the bottom surface of said first side edge of said handle bar cushion approximately halfway between said first end and said second end of said handle bar cushion, and (i) a pair of handle straps, said pair of handle straps comprising a first handle strap and a second handle strap, said first handle strap being fixedly mounted to the bottom surface of said handle bar cushion near the first end of said handle bar cushion, said second handle strap being fixedly mounted to the bottom surface of said handle bar cushion near said second end of said handle bar cushion, said first handle strap having two ends, a first end and a second end, said first handle strap having two surfaces, a top surface and a bottom surface, said second handle strap having two ends, a first end and a second end, said second handle strap having two surfaces, a top surface and a bottom surface, said top surfaces of said first end of both said first handle strap and said second handle strap including a first hook-and-loop fastening means fixedly mounted to both of said first ends, said bottom surfaces of said second ends of both said first handle strap and said second handle strap including a second hook-and-loop fastening means fixedly mounted to said second ends, whereby said first hook-and-loop fastening means on said top surface of said first end of said first handle strap is designed to be removably attached to said second hook-and-loop fastening means on said bottom surface of said second end of said first handle strap, whereby said first hook-and-loop fastening means on said top surface of said first end of said second handle strap is designed to be removably attached to said second hook-and-loop fastening means on said bottom surface of said second end of said second handle strap.

* * * * *